United States Patent
Sano et al.

(10) Patent No.: US 9,953,228 B2
(45) Date of Patent: Apr. 24, 2018

(54) INFORMATION PRESENTING APPARATUS, INFORMATION PRESENTING METHOD, AND COMPUTER PROGRAM PRODUCT

(71) Applicant: Kabushiki Kaisha Toshiba, Minato-ku, Tokyo (JP)

(72) Inventors: Yuma Sano, Kawasaki Kanagawa (JP); Tsuyoshi Tasaki, Yokohama Kanagawa (JP); Manabu Nishiyama, Setagaya Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 64 days.

(21) Appl. No.: 15/258,934

(22) Filed: Sep. 7, 2016

(65) Prior Publication Data

US 2017/0147890 A1 May 25, 2017

(30) Foreign Application Priority Data

Nov. 20, 2015 (JP) .................................. 2015-227350

(51) Int. Cl.
*G06K 9/00* (2006.01)
*G06T 7/00* (2017.01)
(Continued)

(52) U.S. Cl.
CPC ....... *G06K 9/00805* (2013.01); *G06K 9/2054* (2013.01); *G06T 7/0042* (2013.01);
(Continued)

(58) Field of Classification Search
CPC ...... A63F 13/655; A63F 13/00; A63F 13/327; A63F 13/213; A63F 13/25; A63F 13/32;
(Continued)

(56) References Cited

U.S. PATENT DOCUMENTS

2008/0243378 A1* 10/2008 Zavoli .................... G01C 21/28
701/533
2013/0229520 A1* 9/2013 Aimura .............. G06K 9/00825
348/148

FOREIGN PATENT DOCUMENTS

JP H 05-221263 A 8/1993
JP H 08-127291 A 5/1996
(Continued)

*Primary Examiner* — Duy M Dang
(74) *Attorney, Agent, or Firm* — Knobbe, Martens, Olson & Bear, LLP

(57) ABSTRACT

According to an embodiment, an information presenting apparatus to be mounted in a vehicle includes hardware circuitry. The hardware circuitry is configured to acquire driving information including a speed and a steering angle of the vehicle. The hardware circuitry is configured to calculate, based on the driving information, an own vehicle region indicating a region in which the vehicle moves. The hardware circuitry is configured to acquire target object position information indicating a position of a target object present in surroundings of the vehicle. The hardware circuitry is configured to generate a pair of target object information and presentation information when the position of the target object is included in the own vehicle region. The target object information identifies the target object present at the position of the target object. The presentation information indicates information that encourages the target object to perform a certain action.

20 Claims, 12 Drawing Sheets

(51) Int. Cl.
    *G06T 11/60*     (2006.01)
    *G06K 9/20*     (2006.01)

(52) U.S. Cl.
    CPC .... *G06T 11/60* (2013.01); *G06T 2207/10004* (2013.01); *G06T 2207/20081* (2013.01); *G06T 2207/20221* (2013.01); *G06T 2207/30261* (2013.01)

(58) Field of Classification Search
    CPC ........ A63F 13/332; A63F 13/335; G06T 7/55; G06T 3/0068; G06T 15/04; G06T 7/001; G06T 2207/30261; G06T 2207/30252; G06T 2207/30236; G06T 7/0042; G06T 7/0022; G06T 2207/30241; G06K 9/00228; G06K 9/6202; G06K 9/6279; G06K 9/00785; G06K 9/00791; G06K 9/00; G06K 9/00805; G01S 13/90; G01S 17/89; G01C 21/3602
    See application file for complete search history.

(56) References Cited

FOREIGN PATENT DOCUMENTS

| | | |
|---|---|---|
| JP | 2005-332297 A | 12/2005 |
| JP | 2007-331506 A | 12/2007 |
| JP | 2013-097456 A | 5/2013 |
| JP | 2014-154100 A | 8/2014 |

\* cited by examiner

FIG.14A
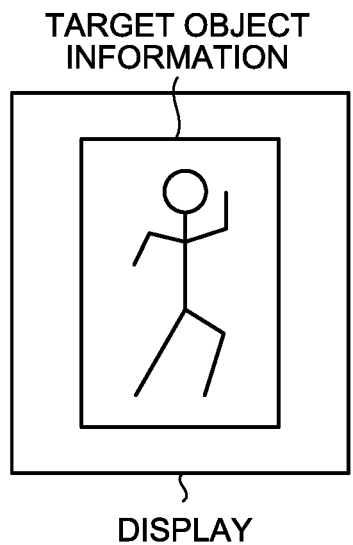
FIG.14B
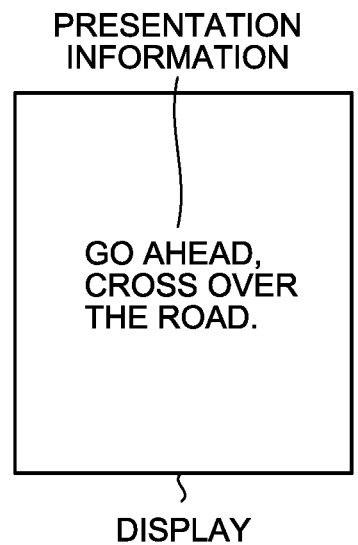
FIG.15
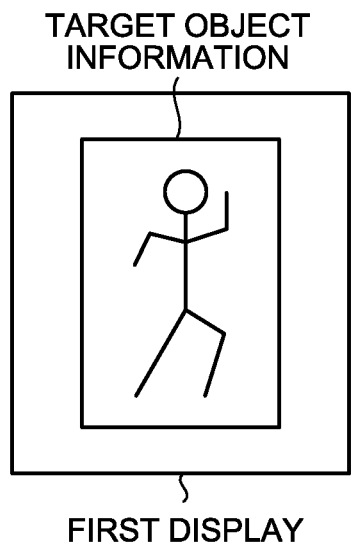

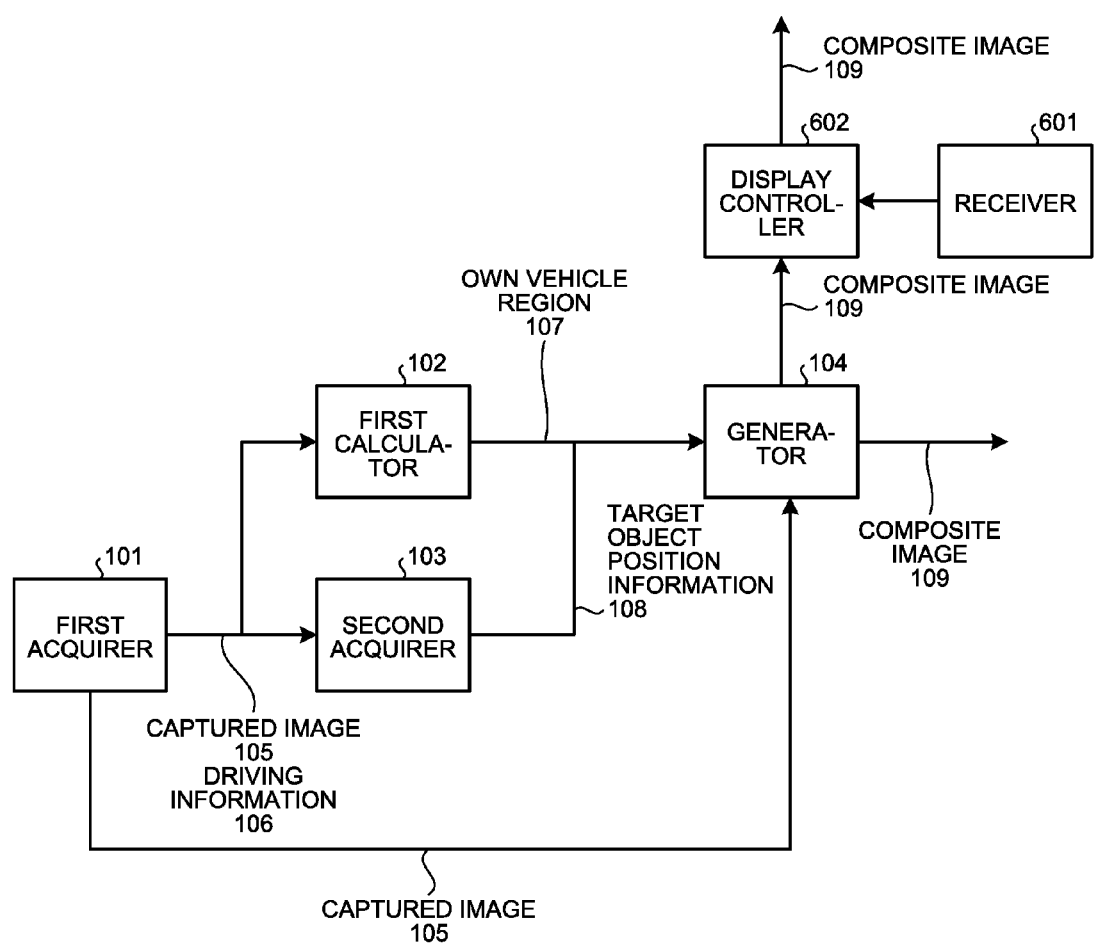

INFORMATION PRESENTING APPARATUS, INFORMATION PRESENTING METHOD, AND COMPUTER PROGRAM PRODUCT

CROSS-REFERENCE TO RELATED APPLICATION

This application is based upon and claims the benefit of priority from Japanese Patent Application No. 2015-227350, filed on Nov. 20, 2015; the entire contents of which are incorporated herein by reference.

FIELD

Embodiments described herein relate generally to an information presenting apparatus, an information presenting method, and a computer program product.

BACKGROUND

For allowing a vehicle to travel safely and smoothly, it is desirable to present certain information that secures safety in traveling of the vehicle to a target object (e.g., a pedestrian) relating to the safety in traveling of the vehicle. Particularly, for allowing an automatic driving vehicle (autonomous driving vehicle) in which a driver who pays attention to driving is absent to travel safely and smoothly, it is necessary to present information to a target object having no special communication means, such as a pedestrian or a bicycle operated by a person.

As a method for presenting information to the other person, a technique is known that presents information by displaying the information selected by a driver on a display displaying information externally from a vehicle, for example. Another technique is known that estimates the driver's intention from driving information (operating information) such as the driver's sight line, a speed of the vehicle, or braking operation of the vehicle and displays the information based on the driver's intention on a display.

The conventional techniques, however, have a problem in that the intention on the vehicle side may not be presented (transmitted) to the other side (target object) to which the intention is to be presented because it is unclear for whom information is displayed on the display.

BRIEF DESCRIPTION OF THE DRAWINGS

FIGS. 14A and 14B are schematic diagrams to explain a displaying method of a pair in a fourth embodiment;

FIG. 15 is a schematic diagram to explain a displaying method of the pair in a modification;

FIG. 18 is a schematic diagram illustrating exemplary functions of the information presenting apparatus in a sixth embodiment.

DETAILED DESCRIPTION

According to an embodiment, an information presenting apparatus to be mounted in a vehicle includes hardware circuitry. The hardware circuitry is configured to acquire driving information that includes at least a speed and a steering angle of the vehicle. The hardware circuitry is configured to calculate, based on the driving information, an own vehicle region that indicates a region in which the vehicle moves. The hardware circuitry is configured to acquire target object position information that indicates a position of a target object present in surroundings of the vehicle. The hardware circuitry is configured to generate a pair of target object information and presentation information when the position indicated by the target object position information is included in the own vehicle region. The target object information identifies the target object present at the position indicated by the target object position information. The presentation information indicates information that encourages the target object to perform a certain action.

The following describes embodiments of an information presenting apparatus, an information presenting method, and a computer program product in detail with reference to the accompanying drawings.

First Embodiment

Figure 1:
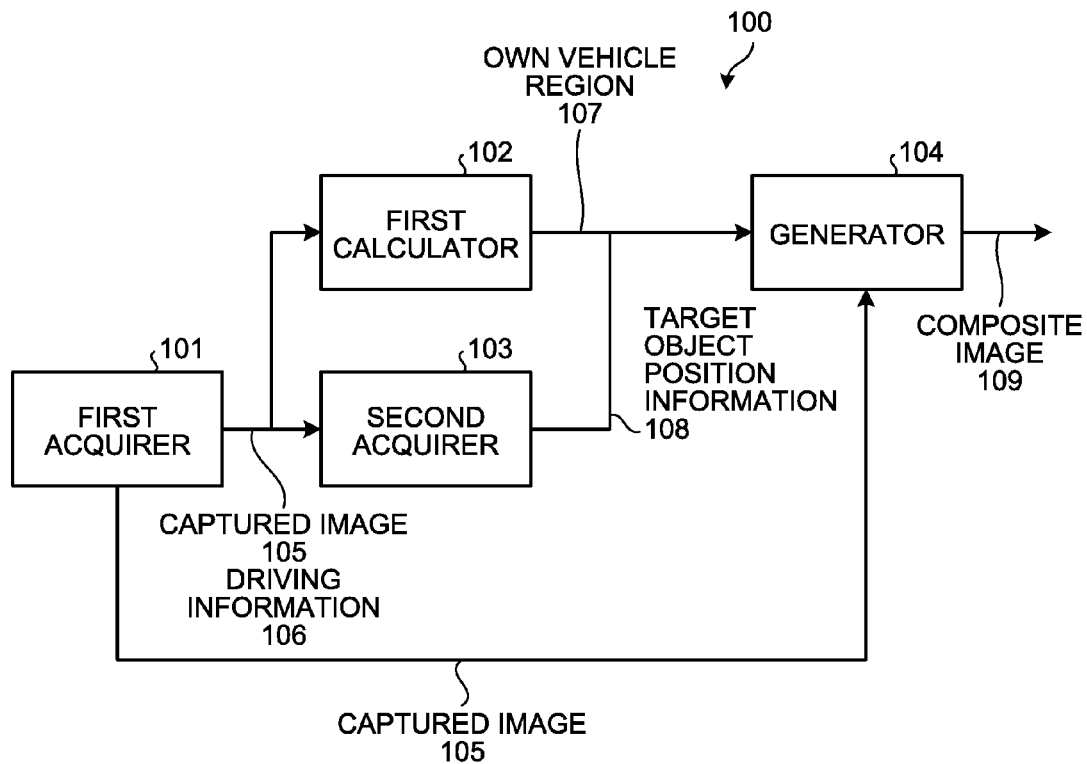
FIG. 1 is a schematic diagram illustrating exemplary functions of an information presenting apparatus in a first embodiment.

FIG. 1 is a schematic diagram illustrating exemplary functions of an information presenting apparatus 100 in a first embodiment. In the first embodiment, the information presenting apparatus 100 is mounted in an automatic driving vehicle that can automatically (autonomously) travel without driving operation by a person. The vehicle in which the information presenting apparatus 100 is mounted is not limited to this example. The information presenting apparatus 100 is mounted in any type of vehicle. For example, the information presenting apparatus 100 may be mounted in a typical vehicle that travels by driving operation by a person.

As illustrated in FIG. 1, the information presenting apparatus 100 includes a first acquirer 101, a first calculator 102, a second acquirer 103, and a generator 104. FIG. 1 exemplarily illustrates mainly the functions relating to the first embodiment for expository convenience. The functions included in the information presenting apparatus 100 are, however, not limited to those illustrated in FIG. 1.

The first acquirer 101 acquires driving information (operating information) that includes at least a speed and a steering angle of the vehicle in which the information presenting apparatus 100 is mounted (the own vehicle). In the embodiment, the first acquirer 101 acquires a captured image obtained by capturing an image of surroundings of the vehicle (own vehicle) together with the driving information. In the specification, the "image capturing" means conversion from the image of a subject (a target to be imaged) formed by an optical system such as a lens into an electrical signal.

Figure 2:
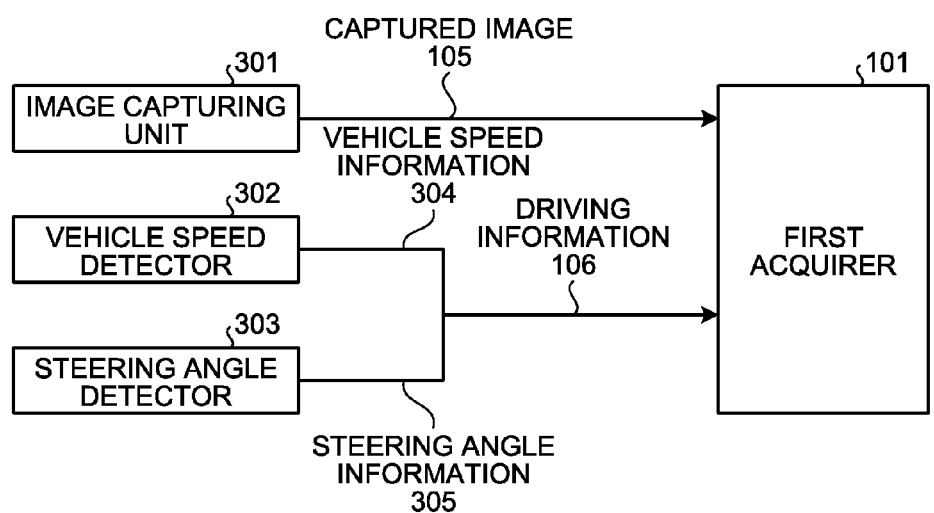
FIG. 2 is a schematic diagram to explain functions of an acquirer in the first embodiment.

As illustrated in FIG. 2, the vehicle in which the information presenting apparatus 100 is mounted includes an image capturing unit 301, a vehicle speed detector 302, and a steering angle detector 303. The image capturing unit 301, which is a device that captures an image of the surroundings of the vehicle, includes a camera, for example. The vehicle speed detector 302 is a device that detects the speed of the own vehicle. The steering angle detector 303 is a device that detects the steering angle of the own vehicle. The steering angle detector 303 can detect, as the steering angle, a rotation angle of a steering wheel used for changing the driving direction of the vehicle accordingly, for example.

In the embodiment, the image capturing unit 301 captures an image of the surroundings of the vehicle at a certain cycle (a predetermined frame rate), and the first acquirer 101 acquires a captured image 105 obtained by the image capturing performed by the image capturing unit 301. The first acquirer 101 continuously acquires the captured image 105 at the certain cycle. The first acquirer 101 acquires driving information 106 that includes vehicle speed information 304 indicating the speed detected by the vehicle speed detector 302 and steering angle information 305 indicating the steering angle detected by the steering angle detector 303 in synchronization with the acquisition of the captured image 105. In the embodiment, the driving information includes vehicle width information indicating the width of the own vehicle. The vehicle width information may be preliminarily stored in a memory in the information presenting apparatus 100 or stored in an external apparatus. The first acquirer 101 can access the memory in the information presenting apparatus 100 or the external apparatus to acquire the vehicle width information in synchronization with the acquisition of the captured image 105, for example.

The first acquirer 101 has the function that continuously acquires the captured image 105 and the driving information 106 at a certain cycle, as described above. Every acquisition of the captured image 105 and the driving information 106, the first acquirer 101 in the embodiment sends the acquired captured image 105 and driving information 106 to the first calculator 102, which is described later, and sends the acquired captured image 105 to the second acquirer 103 and the generator 104, which are described later. The captured image 105 may be obtained by the image capturing performed by the image capturing unit 301 provided to the own vehicle, or may be two or more images obtained by the image capturing performed by two or more image capturing units 301 provided to the own vehicle.

Referring back to FIG. 1, the first calculator 102 calculates, on the basis of the driving information 106, an own vehicle region 107 that indicates a region in which the vehicle (own vehicle) moves. In the embodiment, the first calculator 102 estimates, on the basis of the captured image 105 and the driving information 106, a region in which the vehicle moves (a region in which the vehicle moves in the future) in the captured image 105, and calculates the estimation result as the own vehicle region 107. In this example, every reception of the captured image 105 and the driving information 106 from the first acquirer 101, the first calculator 102 calculates the own vehicle region 107 using the received captured image 105 and driving information 106, and the driving information 106 received in the past, for example.

Figure 3:
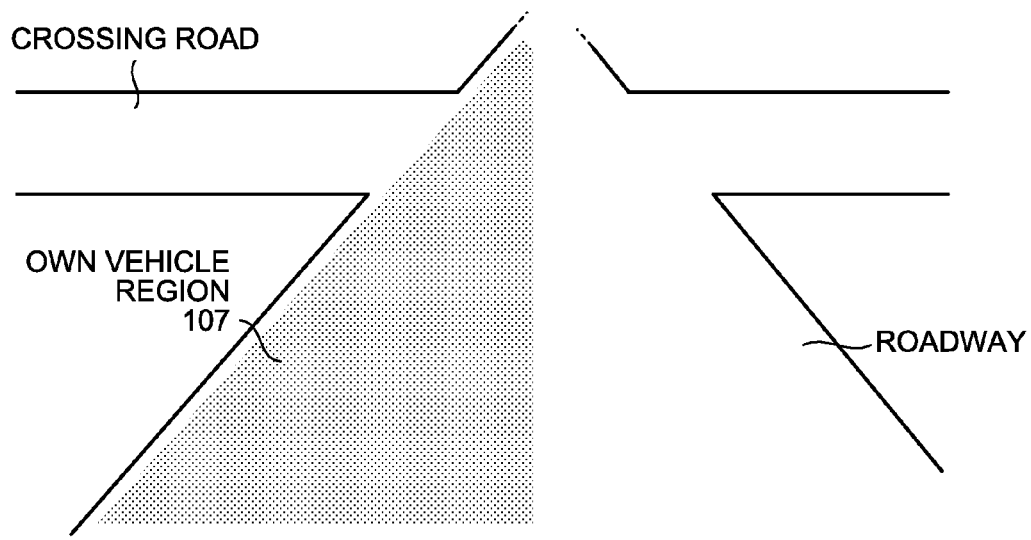
FIG. 3 is a schematic diagram illustrating an example of an own vehicle region in the first embodiment.

FIG. 3 is a schematic diagram illustrating an example of the own vehicle region 107 of the own vehicle that travels straight in the left lane. No operation to rotate the steering wheel is performed in straight traveling. As a result, a change in the steering angle indicated by the steering angle information 305 is zero. The change is a difference between the steering angle information 305 included in the latest driving information 106 and the steering angle information 305 included in the driving information 106 immediately before the latest one. In this case, the first calculator 102 can estimate that the driving (traveling) direction of the own vehicle in the future is the straight driving direction. The first calculator 102 can estimate a region that has a width of the width of the vehicle (the width indicated by the vehicle width information) and extends in the forward direction of the own vehicle with a length according to the vehicle speed indicated by the vehicle speed information 304, and calculate the estimated region as the own vehicle region 107. The own vehicle region 107 may be a wide region that includes not only a roadway on which the vehicle travels but also walkways on both sides of the roadway. The width indicated by the vehicle width information may be obtained by adding a certain value (the width of the walkways) to the vehicle width, for example.

If no change occurs in a positional relation between the image capturing unit 301 and the vehicle (own vehicle), the region in which the vehicle traveling straight travels in the future stays constant regardless of the captured image 105. In the embodiment, the positional relation between the image capturing unit 301 and the vehicle is preliminarily acquired, and a region in which the vehicle traveling straight travels in the future is preliminarily held in a memory as a basic own vehicle region on the basis of the assumption that the positional relation is not changed after the acquisition. The own vehicle region 107 exemplarily illustrated in FIG. 3 is equivalent to the basic own vehicle region. The basic own vehicle region can be expanded or shrunk as the own vehicle region in accordance with the vehicle speed (the vehicle speed indicated by the vehicle speed information 304) detected by the vehicle speed detector 302. For example, the own vehicle region 107 can be set as follows: the basic own vehicle region is expanded in a direction far from the own vehicle when the vehicle speed indicated by the vehicle speed information 304 is faster than a vehicle speed assumed when the basic own vehicle region is set while the basic own vehicle region is shrunk in a direction toward the own vehicle when the vehicle speed indicated by the vehicle speed information 304 is slower than the vehicle speed assumed when the basic own vehicle region is set.

Figure 4:
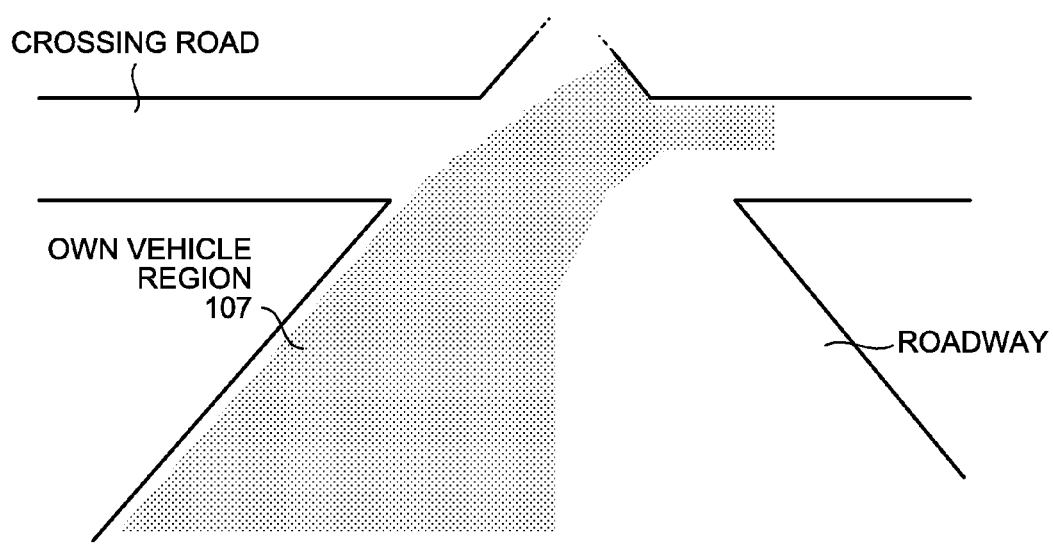
FIG. 4 is a schematic diagram illustrating another example of the own vehicle region in the first embodiment.

When a change in the steering angle indicated by the steering angle information 305 is detected, the first calculator 102 estimates the driving direction of the own vehicle in the future in accordance with a direction of the change in the steering angle. The first calculator 102 can estimate a region extending in the estimated direction with the vehicle width and calculate the estimated region as the own vehicle region 107. FIG. 4 is a schematic diagram illustrating an example of the own vehicle region 107 when operation to rotate the steering wheel is performed such that the own vehicle traveling in the left lane travels on the right side in the driving direction (turns right) (operation to rotate the steering wheel clockwise). The own vehicle region 107 when the own vehicle turns right as illustrated in FIG. 4 changes to the right side in the driving direction, which corresponds to the rotation direction of the steering wheel, from the own vehicle region 107 when the own vehicle travels straight as illustrated in FIG. 3. In this way, the first calculator 102 calculates the own vehicle region 107. In this example, every reception of the captured image 105 and the driving information 106 from the first acquirer 101, the first calculator 102 calculates the own vehicle region 107 and sends the calculated own vehicle region 107 to the generator 104.

Referring back to FIG. 1, the second acquirer 103 acquires target object position information 108 that indicates the position of the target object present in the surroundings of the vehicle (own vehicle). More specifically, the second acquirer 103 acquires the target object position information 108 that indicates the position of the target object present in the surroundings of the vehicle (own vehicle) out of one or more target objects representing predetermined objects (e.g., a person and another vehicle). In the embodiment, the second acquirer 103 acquires, as the target object position information 108, information that indicates the position of the target object captured in the captured image 105 in the captured image 105.

Figure 5:
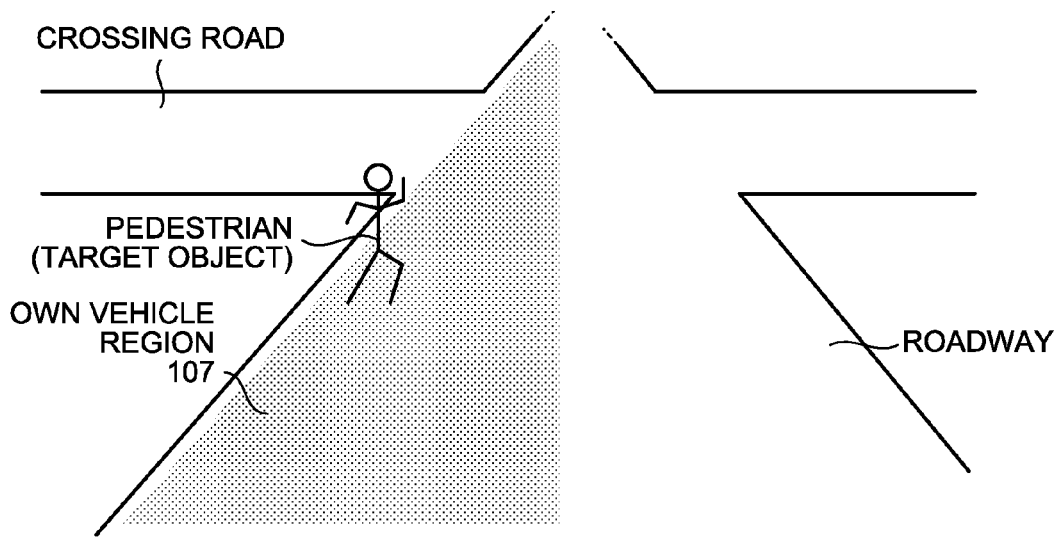
FIG. 5 is a schematic diagram illustrating an example of a target object in the first embodiment.

The second acquirer 103 preliminarily holds images of the target objects such as a pedestrian, a bicycle, and a vehicle as training data, extracts features from the respective images, and generates identifiers (a plurality of identifiers each of which corresponds to one of a plurality of target objects) that identify the respective target objects on the basis of the respective features. The second acquirer 103 calculates the features of the target objects captured in the captured image 105 and detects the target object corresponding to the identifier from the captured image 105 using the preliminarily generated identifier. In the processing, the second acquirer 103 calculates (acquires), as the target object position information 108, the information that indicates the position of the detected target object in the captured image. FIG. 5 is a schematic diagram illustrating a case where a pedestrian, which is an example of the target objects, is present forward in the driving direction of the own vehicle. Examples of the feature include histograms of oriented gradients (HOG) and co-occurrence histograms of oriented gradients (CoHOG). The usable feature is, however, not limited to the examples. As an identification method based on the feature, a linear support vector machine (SVM) can be used, for example. The identification method is, however, not limited to this example.

The second acquirer 103 acquires the target object position information 108, as described above. In this example, every reception of the captured image 105 from the first acquirer 101, the second acquirer 103 calculates the target object position information 108 and sends the calculated target object position information 108 to the generator 104. In this example, the second acquirer 103 sends information (in the following description, described as "type information" in some cases) that indicates a type of the target object present at the position indicated by the target object position information 108 to the generator 104 together with the target object position information 108.

Referring back to FIG. 1, the generator 104 generates a pair of target object information and presentation information when the position indicated by the target object position information 108 is included in the own vehicle region 107. The target object information identifies the target object present at the position indicated by the target object position information 108. The presentation information indicates information that encourages the target object to perform a certain action. In the embodiment, the generator 104 determines whether the position (position in the captured image 105) indicated by the target object position information 108 received from the second acquirer 103 is included in the own vehicle region 107 (the region in the captured image 105) received from the first calculator 102. When the determination result is positive, the generator 104 determines that the target object present at the position indicated by the target object position information 108 affects the safety in traveling of the own vehicle. In this case, the generator 104 generates, as the presentation information, the information that encourages the target object to perform an action for securing the safety in traveling of the own vehicle. In this case, the generator 104 generates, as the presentation information, the information that yields right-of-way to the target object over the own vehicle. The presentation information is, however, not limited to this example.

In this case (when the determination result is positive), the generator 104 generates, as the target object information, an image of the region corresponding to the position indicated by the target object position information 108 in the captured image 105. As described above, in this example, the generator 104 receives the type information together with the target object position information 108 from the second acquirer 103. The generator 104, thus, can detect that the target object (e.g., a pedestrian) of the type indicated by the type information received together with the target object position information 108 is captured at the position indicated by the target object position information 108 received from the second acquirer 103 in the captured image 105 received from the first acquirer 101, and generate a cut-out image of the region where the detected target object is captured as the target object information. The cut-out image of the region where the target object is captured in the captured image 105 may be used as the target object information without any change. Alternatively, the cut-out image may be subjected to processing such as blurring processing or monochromatic processing to be used as the target object information.

Figure 6:
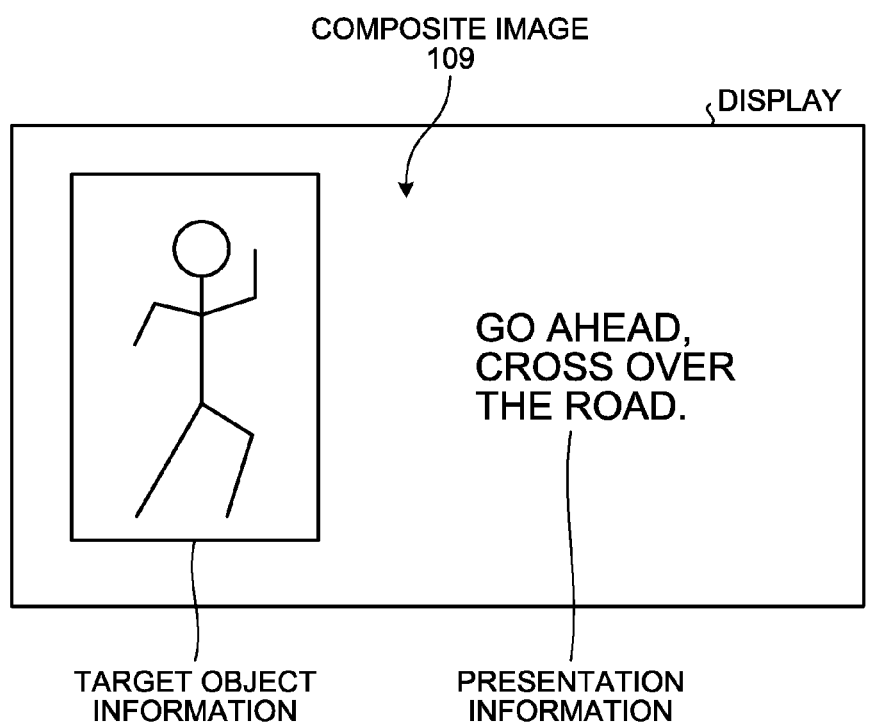
FIG. 6 is a schematic diagram illustrating an example of a composite image in the first embodiment.

The generator 104 performs control so as to cause a display, which displays information externally from the vehicle and is not illustrated in FIG. 1, to display the pair thus generated (the pair of the target object information and the presentation information). In the embodiment, as illustrated in FIG. 6, the generator 104 performs control so as to cause the display to display a composite image 109 (an example of the "pair") in which the target object information and the presentation information are composed as a single image.

The display may be included in the information presenting apparatus 100 as a component, or provided as an external unit of the information presenting apparatus 100 (not included in the information presenting apparatus 100).

Figure 7:
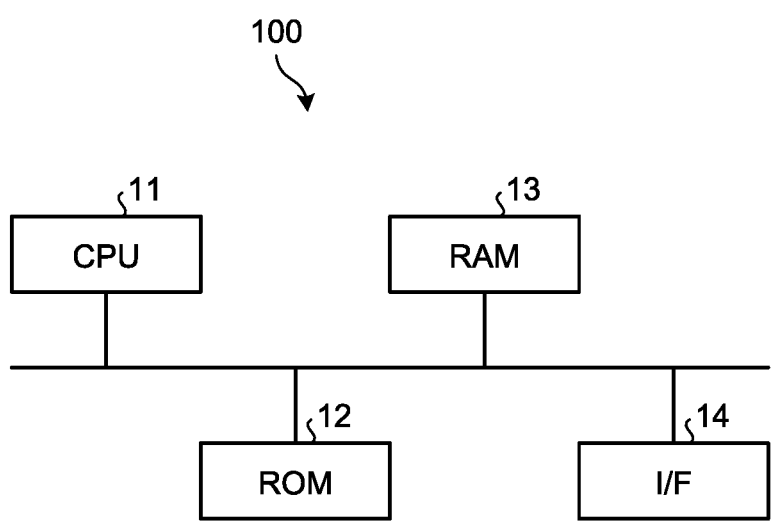
FIG. 7 is a schematic diagram illustrating an exemplary hardware structure of the information presenting apparatus in the first embodiment.

FIG. 7 is a schematic diagram illustrating an exemplary hardware structure of the information presenting apparatus 100. FIG. 7 exemplarily illustrates mainly the minimum required hardware components. The hardware components included in the information presenting apparatus 100 are, however, not limited to those illustrated in FIG. 7.

As illustrated in FIG. 7, the information presenting apparatus 100 includes a central processing unit (CPU) 11, a read only memory (ROM) 12, a random access memory (RAM) 13, and an interface (I/F) 14. The CPU 11 integrally controls the operation of the information presenting apparatus 100.

The ROM 12 is a non-volatile memory that stores therein various types of data such as computer programs. The RAM 13 is a volatile memory that functions as a working area of various types of processing executed by the CPU 11. The I/F 14 is an interface to communicate with (connect to) other external equipment.

The functions of the information presenting apparatus 100 (the first acquirer 101, the first calculator 102, the second acquirer 103, and the generator 104) are achieved by the CPU 11 executing a computer program stored in the ROM 12, for example. The functions are not limited to being achieved as described above. At least a part of the functions of the information presenting apparatus 100 may be achieved by a dedicated hardware circuit (e.g., a semiconductor integrated circuit), for example.

Figure 8:
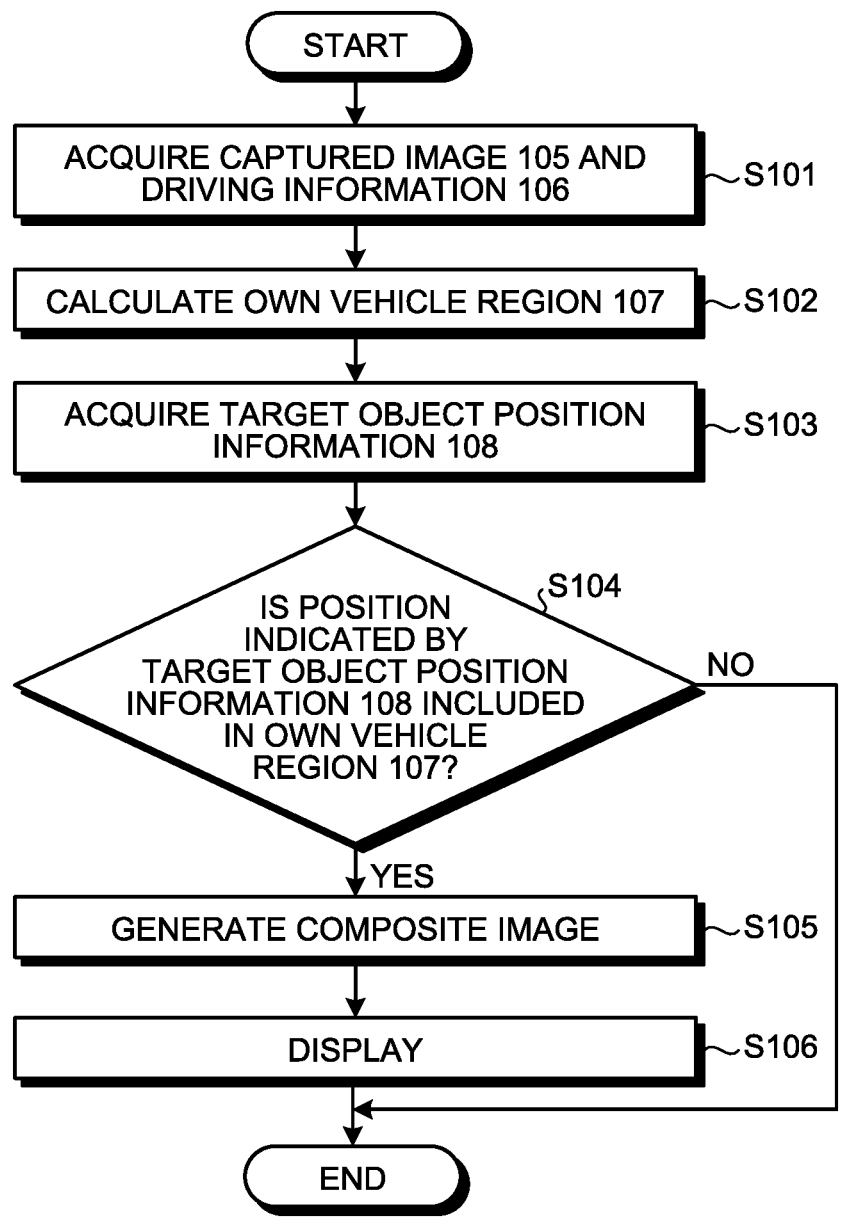
FIG. 8 is a schematic diagram illustrating an example of operation of the information presenting apparatus in the first embodiment.

FIG. 8 is a flowchart illustrating an example of the operation of the information presenting apparatus 100 in the embodiment. The specific contents of the respective steps are described above. The description thereof is, thus, appropriately omitted. As illustrated in FIG. 8, the first acquirer 101 acquires the captured image 105 and the driving information 106 (step S101). The first calculator 102 calculates the own vehicle region 107 (step S102). The second acquirer 103 acquires the target object position information 108 (step S103). The generator 104 determines whether the position indicated by the target object position information 108 acquired at step S103 is included in the own vehicle region 107 calculated at step S102 (step S104).

If the result at step S104 is positive (Yes at step S104), the generator 104 generates the composite image 109 (step S105). The generator 104 performs control so as to cause the display to display the composite image 109 composed at step S105 (step S106). If the result at step S104 is negative (No at S104), the processing ends. In this case, the generator 104 can also perform control so as to cause the display to display certain information such as an advertisement, which is unrelated to the information encouraging the target object to perform an action for securing the safety in traveling of the own vehicle, for example. The information presenting apparatus 100 performs the operation repeatedly at a certain cycle.

As described above, in the embodiment, the generator 104 generates a pair of the target object information that identifies the target object present at the position indicated by the target object position information 108 and the presentation information that indicates information that encourages the target object to perform a certain action when the position indicated by the target object position information 108 is included in the own vehicle region 107. More specifically, as illustrated in FIG. 6, the generator 104 performs control so as to cause the display to display the composite image 109 in which the target object information and the presentation information are composed as a single image. As a result, it is made clear that the target object to which the presentation information is intended to be presented is the target object identified by the target object information paired with the presentation information. Consequently, the presentation information can be reliably presented to the target object to which the presentation information is intended to be presented.

Particularly, when the vehicle in which the information presenting apparatus 100 is mounted is an automatic driving vehicle, it is necessary to reliably present the presentation information (information encouraging the target object to perform an action for securing the safety in traveling of the own vehicle) to the target object having no special communication means. The structure of the embodiment can reliably present the presentation information when the target object to which the presentation information is intended to be presented has no special communication means. The information presenting apparatus 100 in the embodiment is, thus, especially effective when the information presenting apparatus 100 is mounted in an automatic driving vehicle.

Modification of the First Embodiment

The information presenting apparatus 100 may communicate with an external apparatus to periodically acquire relative position information that indicates the position of the vehicle (own vehicle) and the position of the target object. The first calculator 102 may calculate the own vehicle region 107 on the basis of the relative position information acquired from the external apparatus and the driving information 106 acquired by the first acquirer 101, and the second acquirer 103 may acquire the target object position information 108 on the basis of the relative position information acquired from the external apparatus.

The information presenting apparatus 100 can also communicate with the external apparatus to periodically acquire the relative position information that indicates the position of the vehicle (own vehicle) and the position of the target object in a first coordinate system that is the coordinate system of the actual space in the surroundings of the vehicle, for example. In this case, the first calculator 102 can also identify the position of the target object in the first coordinate system using the relative position information acquired from the external apparatus, and convert the identified position into the position in a second coordinate system that is the coordinate system of the captured image 105. The first calculator 102 can estimate the region in which the vehicle (own vehicle) moves in the captured image 105 on the basis of the information (coordinate values) that is obtained by the conversion and indicates the position of the target object in the second coordinate system and the driving information 106 received from the first acquirer 101, and calculate the estimation result as the own vehicle region 107. Likewise, the second acquirer 103 can calculate the position of the target object in the second coordinate system using the relative position information acquired from the external apparatus, and acquire the information indicating the calculated position as the target object position information 108. Known various coordinate converting methods can be used for converting the information indicating the position of the target object in the first coordinate system into the information indicating the position of the target object in the second coordinate system.

Alternatively, the first calculator 102 can identify the position of the target object in the first coordinate system using the relative position information acquired from the external apparatus, estimate the region in which the vehicle (own vehicle) moves in the surrounding region of the vehicle in the first coordinate system on the basis of the information indicating the identified position and the driving information 106 received from the first acquirer 101, and calculate the estimation result as the own vehicle region 107. The own vehicle region 107 may be indicated by the first coordinate system, as described above. Likewise, the second acquirer 103 can also identify the position of the target object in the first coordinate system using the relative position information acquired from the external apparatus, and acquire the information indicating the identified position as the target object position information 108. The target object position information 108 may be indicated by the first coordinate system, as described above.

In this case, the generator 104 determines whether the position (the information indicated by the first coordinate system) indicated by the target object position information 108 received from the second acquirer 103 is included in the own vehicle region 107 (the information indicated by the first coordinate system) received from the first calculator 102. When the determination result is positive, the generator 104 determines that the target object present at the position indicated by the target object position information 108 affects the safety in traveling of the own vehicle. In this case, the generator 104 generates the pair of the target object information that identifies the target object present at the position indicated by the target object position information 108 and the presentation information. When generating the target object information, the generator 104 may convert the target object position information 108 indicated by the first coordinate system, which is received from the second acquirer 103, into the information indicated by the second coordinate system. In this example, the generator 104 receives the type information from the second acquirer 103. The generator 104, thus, can also detect that the target object of the type indicated by the type information received from the second acquirer 103 is captured at the position indicated by the target object position information 108 (the information indicated by the second coordinate system) after the conversion in the captured image 105 received from the first acquirer 101, and generate a cut-out image of the region where the detected target object is captured as the target object information.

Second Embodiment

Figure 9:
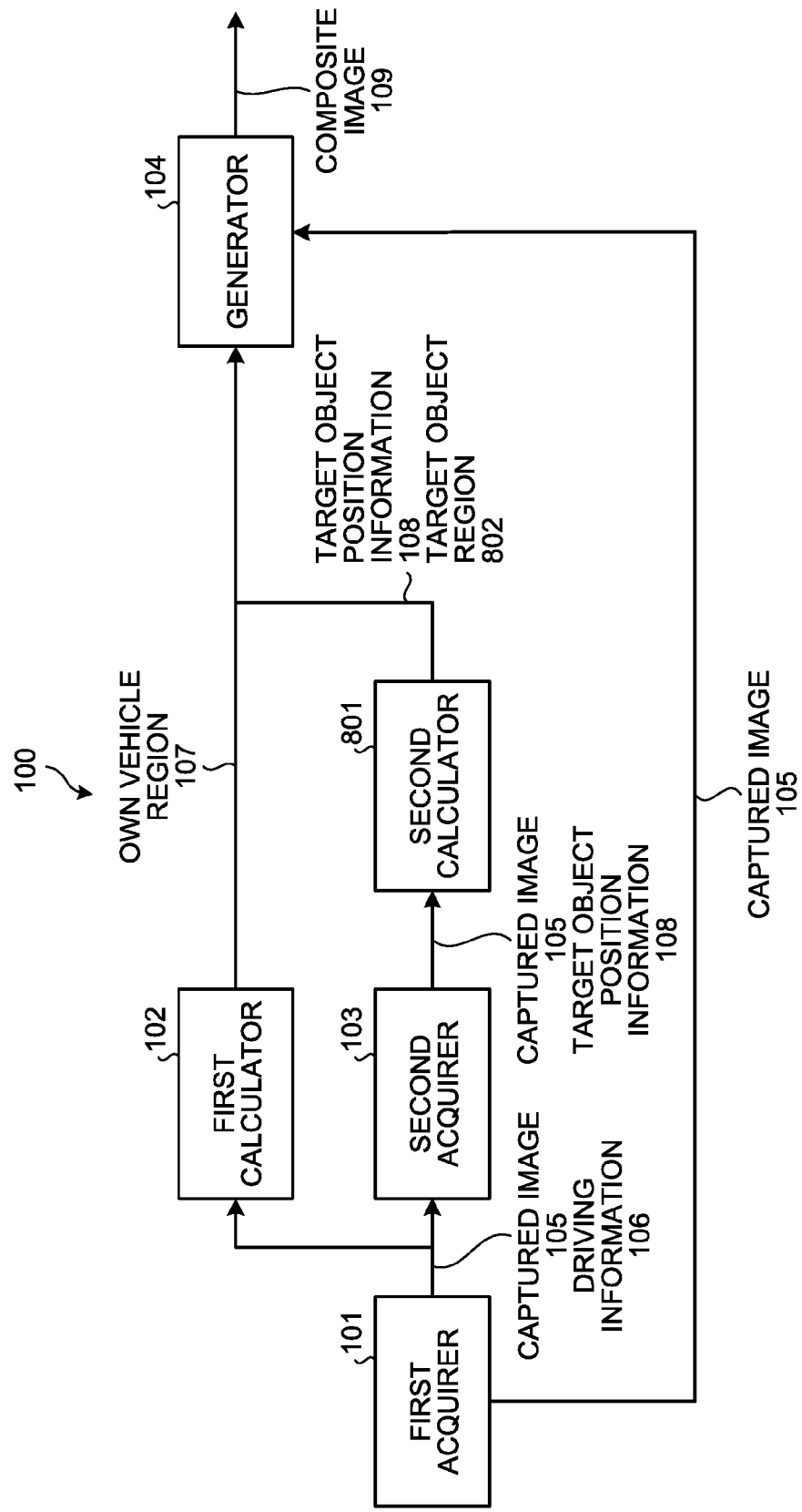
FIG. 9 is a schematic diagram illustrating exemplary functions of the information presenting apparatus in a second embodiment.

The following describes a second embodiment. Descriptions in common with those of the first embodiment are appropriately omitted. FIG. 9 is a schematic diagram illustrating exemplary functions of the information presenting apparatus 100 in the second embodiment. As illustrated in FIG. 9, the information presenting apparatus 100 in the second embodiment differs from the information presenting apparatus 100 in the first embodiment in that the information presenting apparatus 100 in the second embodiment further includes a second calculator 801.

In this example, every acquisition of the target object position information 108, the second acquirer 103 sends the acquired target object position information 108 and the captured image 105 received from the first acquirer 101 to the second calculator 801. More specifically, the second acquirer 103 sends the target object position information 108 and the captured image 105 to the second calculator 801 together with the type information.

The second calculator 801 calculates a target object region 802 that indicates a region in which the target object moves on the basis of the target object position information 108. In the embodiment, the second calculator 801 calculates the target object region 802 that indicates the region in which the target object moves on the basis of a change in the target object position information 108. More specifically, the second calculator 801 estimates a moving vector of the target object using a plurality of captured images 105 obtained at different timings and a plurality of pieces of target object position information 108 each corresponding to one of the captured images 105, and estimates the target object region 802 that indicates the region in which the target object moves in the future in the captured image 105 using the estimated moving vector.

Figure 10:
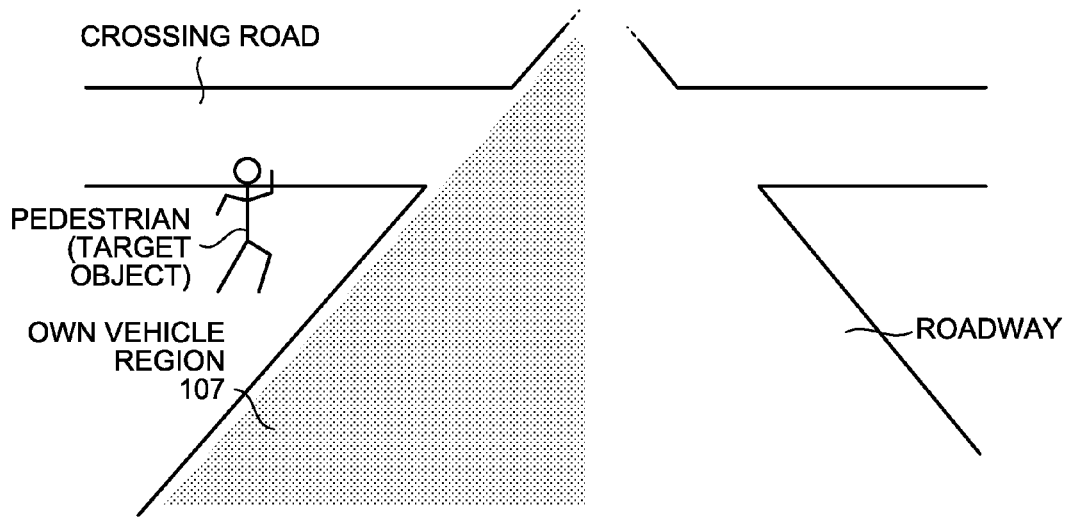
FIG. 10 is a schematic diagram to explain a calculation method of a target object region in the second embodiment.
Figure 11:
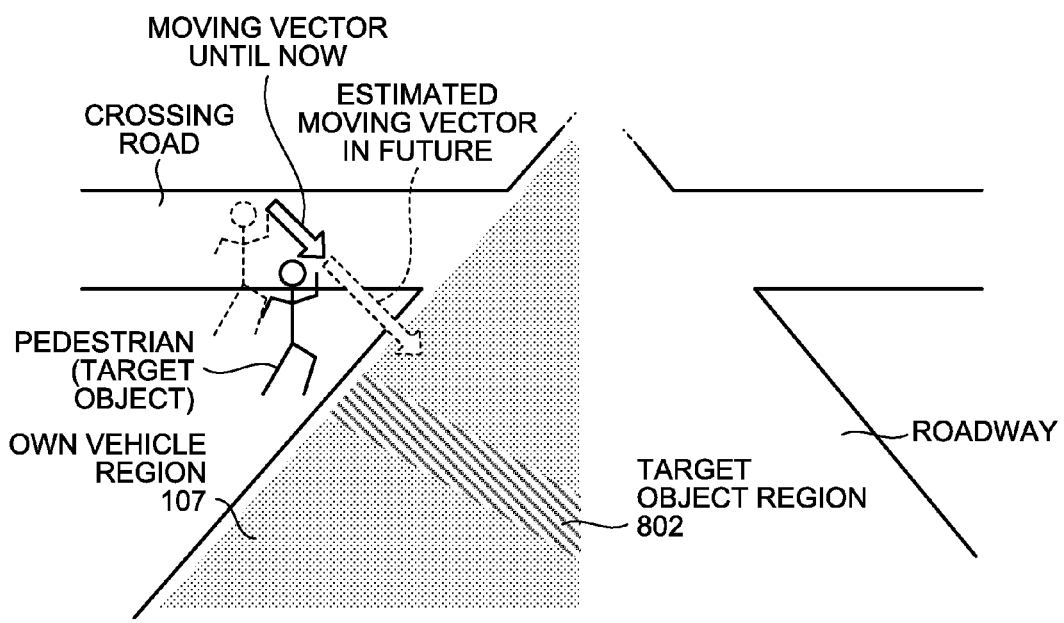
FIG. 11 is another schematic diagram to explain the calculation method of the target object region in the second embodiment.

As described above, the image capturing unit 301 captures images of the surroundings of the own vehicle in time series. Examples of the captured images 105 obtained at two successive timings are illustrated in FIGS. 10 and 11. The second acquirer 103 detects the pedestrian (an example of the target objects) in each of the frames (captured images 105) in FIGS. 10 and 11. In FIG. 11, the moving vector is illustrated that indicates the direction from the pedestrian's position detected in the previous frame (the captured image 105 in FIG. 10) toward the pedestrian's position detected in the present frame (the captured image 105 in FIG. 11). The second calculator 801 can estimate the moving vector of the pedestrian in the future using this moving vector. The second calculator 801 estimates the region in which the pedestrian walks in the future in the captured image 105 using the moving vector of the pedestrian in the future, calculates the estimated region as the target object region 802, and sends the target object region 802 to the generator 104 together with the target object position information 108 indicating the pedestrian's position in the present frame. As described above, every reception of the captured image 105 and the target object position information 108 from the second acquirer 103, the second calculator 801 calculates the target object region 802 and sends the calculated target object region 802 and the target object position information 108 received from the second acquirer 103 to the generator 104. More specifically, the second calculator 801 sends the target object region 802 thus calculated and the target object position information 108 received from the second acquirer 103 to the generator 104 together with the type information.

In the embodiment, the target object region 802 is estimated using two frames as an example. The number of frames used for the estimation is not limited to two. The target object region 802 may be estimated using three or more frames (two or more frames in the past).

The generator 104 in the embodiment generates a pair of the target object information and the presentation information when at least a part of the target object region 802 overlaps the own vehicle region 107. The target object information identifies the target object present at the position indicated by the target object position information 108. The presentation information indicates information that encourages the target object to perform a certain action. More specifically, the generator 104 determines whether at least a part of the target object region 802 received from the second calculator 801 is included in the own vehicle region 107 received from the first calculator 102. When the determination result is positive, the generator 104 determines that the target object captured in the present frame (the target object present at the position indicated by the target object position information 108 received from the second calculator 801 together with the target object region 802) affects the safety in traveling of the own vehicle. In this case, the generator 104 generates the pair of the target object information that identifies the target object present at the position indicated by the target object position information 108 received from the second calculator 801 and the presentation information, in the same manner as the first embodiment. The specific contents are described above. In this example, the generator 104 generates, as the presentation information, the information that yields right-of-way to the target object over the own vehicle in the same manner as the first embodiment. The presentation information is not limited to this example. For example, the generator 104 can also generate, as the presentation information, the information that encourages the pedestrian to stop so as to allow the own vehicle to travel on ahead.

In the same manner as the first embodiment, the structure of the second embodiment makes it clear that the target object to which the presentation information is intended to be presented is the target object identified by the target object information paired with the presentation information. Consequently, the presentation information can be reliably presented to the target object to which the presentation information is intended to be presented.

First Modification of the Second Embodiment

When the target object captured in the captured image 105 is another vehicle (when the target object present at the position indicated by the target object position information 108 in the captured image 105 is another vehicle), the second calculator 801 can also estimate the moving direction of the other vehicle serving as the target object present at the position indicated by the target object position information 108 in the captured image 105 from a lighting state of indicators of the other vehicle, and calculate the region corresponding to the estimated moving direction in the captured image 105 as the target object region 802, for example.

Figure 12:
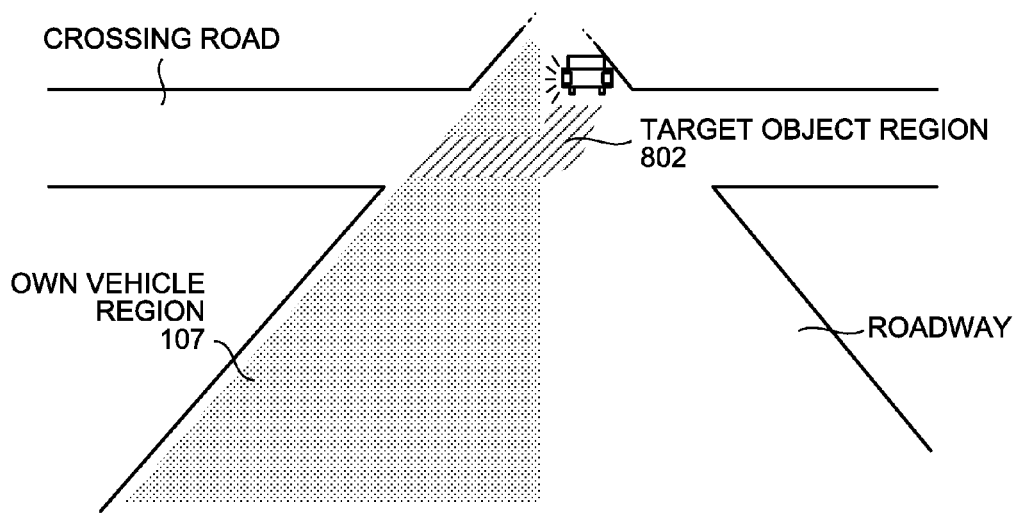
FIG. 12 is a schematic diagram to explain an example of the target object region in a modification.

FIG. 12 illustrates an example of a case where an oncoming vehicle flashing the indicator on the right side is present at an intersection in front of the own vehicle. In this case, the second calculator 801 can detect that the oncoming vehicle present at the position indicated by the target object position information 108 in the captured image 105 is flashing the indicator on the right side using the target object position information 108 continuously sent from the second acquirer 103 and the corresponding captured images 105 to estimate that the oncoming vehicle turns right in the future, and calculate a passing-through region after the right turn in the captured image 105 as the target object region 802.

Second Modification of the Second Embodiment

When the target object captured in the captured image 105 is a person (when the target object present at the position indicated by the target object position information 108 in the captured image 105 is a person), the second calculator 801 can also estimate the moving direction of the person serving as the target object present at the position indicated by the target object position information in the captured image 105 from a direction of the face or the body of the person, and calculate the region corresponding to the estimated moving direction in the captured image 105 as the target object region 802, for example.

Third Modification of the Second Embodiment

In the same manner as the modification of the first embodiment, the information presenting apparatus 100 may communicate with an external apparatus to periodically acquire the relative position information that indicates the position of the vehicle (own vehicle) and the position of the target object, for example. In the same manner as the modification of the first embodiment, the first calculator 102 can calculate the own vehicle region 107 on the basis of the relative position information acquired from the external apparatus and the driving information 106 acquired by the first acquirer 101, and the second acquirer 103 can acquire the target object position information 108 on the basis of the relative position information acquired from the external apparatus.

The information presenting apparatus 100 can also communicate with the external apparatus to periodically acquire the relative position information that indicates the position of the vehicle (own vehicle) and the position of the target object in the first coordinate system that is the coordinate system of the actual space in the surroundings of the vehicle, for example. In this case, the second acquirer 103 may identify the position of the target object in the first coordinate system using the relative position information acquired from the external apparatus, and acquire the information indicating the identified position as the target object position information 108.

In this case, every acquisition of the target object position information 108 indicated by the first coordinate system, the second acquirer 103 sends the acquired target object position information 108 to the second calculator 801. In this case, the second acquirer 103 does not need to send the captured image 105 to the second calculator 801. The second acquirer 103 sends the target object position information 108 indicated by the first coordinate system to the second calculator 801 together with the type information.

The second calculator 801 can also estimate the region in which the target object moves in the surrounding region of the vehicle in the first coordinate system on the basis of a change in the target object position information 108 indicated by the first coordinate system, and calculate the estimation result as the target object region 802 (information indicated by the first coordinate system). In this case, the own vehicle region 107 calculated by the first calculator 102 is also preferably indicated by the first coordinate system for matching the coordinate systems of the targets used for the determination by the generator 104.

The second acquirer 103 can also identify the position of the target object in the first coordinate system using the relative position information acquired from the external apparatus, and convert the identified position into the position in the second coordinate system that is the coordinate system of the captured image 105, for example. The second acquirer 103 may acquire, as the target object position information 108, the information that indicates the position, which is obtained by the conversion, of the target object in the second coordinate system. In this case, every acquisition of the target object position information 108 indicated by the second coordinate system, the second acquirer 103 sends the acquired target object position information 108 and the captured image 105 received from the first acquirer 101 to the second calculator 801 together with the type information.

The second calculator 801 can also estimate the region in which the target object moves in the captured image 105 on the basis of a change in the target object position information 108 indicated by the second coordinate system, and calculate the estimation result as the target object region 802. In this case, the own vehicle region 107 calculated by the first calculator 102 is also preferably indicated by the second coordinate system for matching the coordinate systems of the targets used for the determination by the generator 104.

Every calculation of the target object region 802 as described above, the second calculator 801 sends the calculated target object region 802 to the generator 104 together with the type information received from the second acquirer 103.

In short, the second calculator 103 can acquire the target object position information 108 on the basis of the relative position information acquired from the external apparatus, and the second calculator 801 can calculate the target object region 802 on the basis of a change in the target object position information 108 acquired by the second calculator 103.

Fourth Modification of the Second Embodiment

The second acquirer 103 may receive the driving information 106 from the first acquirer 101 and change a range (target range) serving as the target from which the target object position information 108 is acquired in the surroundings of the vehicle (own vehicle) in accordance with the vehicle speed indicated by the vehicle speed information 304 included in the received driving information 106. For example, with an increase in the vehicle speed, the target range is preferably expanded while with a decrease in the vehicle speed, the target range is preferably shrunk. This structure can detect the presence or absence of the target object only in the range affecting the safety in traveling of the own vehicle, thereby making it possible to enhance efficiency in processing. The structure is also applicable to the first embodiment.

Third Embodiment

The following describes a third embodiment. Descriptions in common with those of the respective embodiments described above are appropriately omitted. In the third embodiment, the generator 104 generates, as the target object information, a pictogram that represents the target object present at the position indicated by the target object position information 108. As described above, the generator 104 receives the type information from the second acquirer 103 (or the second calculator 801) together with the target object position information 108. The generator 104, thus, can generate, as the target object information, a pictogram (pictorial symbol) that represents the target object (equivalent to the target object present at the position indicated by the target object position information 108) of the type indicated by the received type information. This process makes it possible to generate the target object information without using the captured image 105. In the structure, the generator 104 does not need to receive the captured image 105 from the first acquirer 101, for example.

Figure 13A:
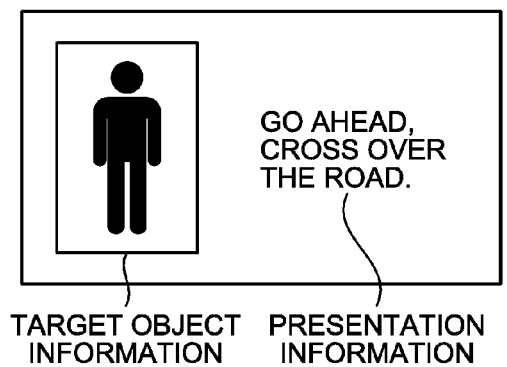
FIGS. 13A to 13D are schematic diagrams to explain target object information generated in a third embodiment.
Figure 13B:
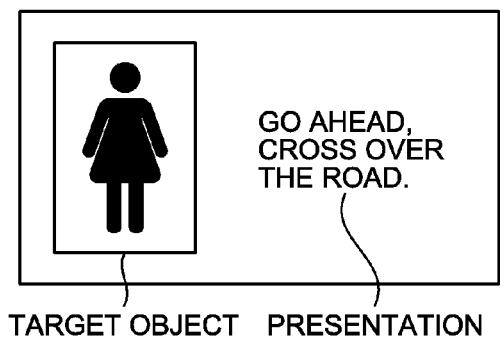
Figure 13C:
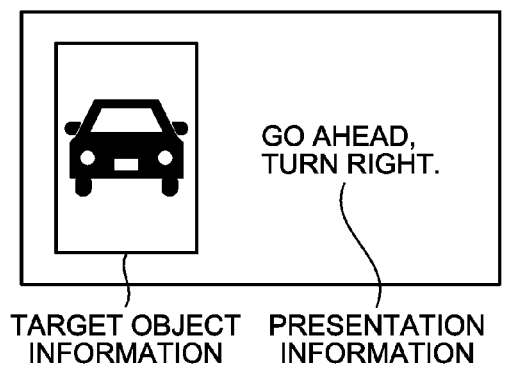
Figure 13D:
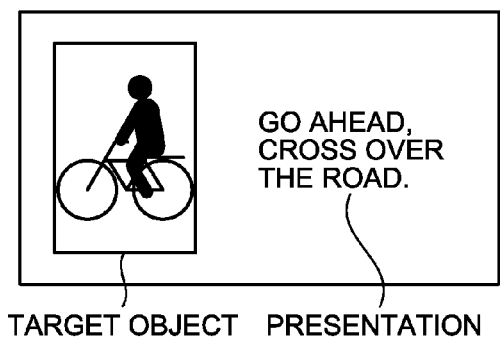

For example, the type information indicates a male, the generator 104 can generate, as the target object information, the pictogram representing a male as illustrated in FIG. 13A. For another example, the type information indicates a female, the generator 104 can generate, as the target object information, the pictogram representing a female as illustrated in FIG. 13B. For another example, the type information indicates a vehicle (assumed to be provided with no special communication means), the generator 104 can generate, as the target object information, the pictogram representing a vehicle as illustrated in FIG. 13C. For another example, the type information indicates a bicycle operated by a person, the generator 104 can generate, as the target object information, the pictogram representing a bicycle operated by a person as illustrated in FIG. 13D. The types of pictogram are not limited to the person (male and female), the vehicle, and the bicycle as described above. The structure of the third embodiment can reliably present the presentation information to the target object to which the presentation information is intended to be presented without using the captured image 105.

Modification of the Third Embodiment

When the target object is a person, the generator 104 can generate, as the target object information, a pictogram in which the color of the person's clothes is reflected, for example. When the target object is another vehicle (typically a car), the generator 104 can generate, as the target object information, a pictogram in which the color of the other vehicle is reflected. As a result, the target object to which the presentation information is intended to be presented is made clearer.

Fourth Embodiment

The following describes a fourth embodiment. Descriptions in common with those of the respective embodiments described above are appropriately omitted. The fourth embodiment differs from the embodiments described above in that the generator 104 performs control so as to cause the display to display the target object information and the presentation information composing the pair at timings different from each other.

In the first embodiment, as illustrated in FIG. 6, the generator 104 composes the target object information and the presentation information into a single image so as to display them on the same screen at the same timing. In contrast, in the fourth embodiment, the generator 104 performs control so as to cause the display to display the target object information and the presentation information alternately without generating the composite image described above. For example, the generator 104 performs control so as to cause the display to display the target object information at a timing T1 as illustrated in FIG. 14A while the generator 104 performs control so as to cause the display to display the presentation information at a timing T2 after the timing T1 as illustrated in FIG. 14B. The generator 104 can repeat the control described above for a certain time period. This structure is an aspect of the concept that "the generator 104 performs control so as to cause the display displaying information externally from the vehicle (own vehicle) to display the pair".

First Modification of the Fourth Embodiment

As exemplarily illustrated in FIG. 15, the generator 104 may perform control so as to cause a first display displaying information externally from the vehicle to display the target object information composing the pair and control so as to cause a second display differing from the first display and displaying information externally from the vehicle to display the presentation information composing the pair at the same timing. This structure is also an aspect of the concept that "the generator 104 performs control so as to cause the display displaying information externally from the vehicle (own vehicle) to display the pair".

Second Modification of the Fourth Embodiment

Figure 16A:
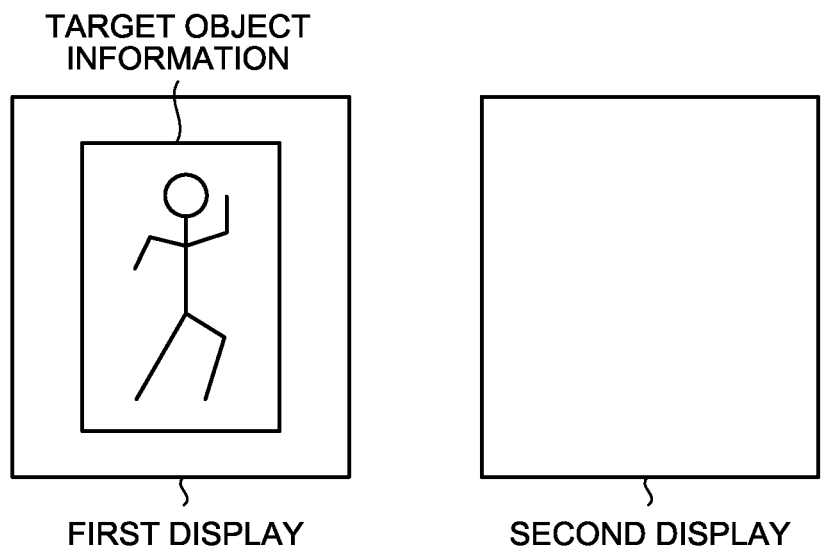
FIGS. 16A and 16B are schematic diagrams to explain a displaying method of the pair in another modification.
Figure 16B:
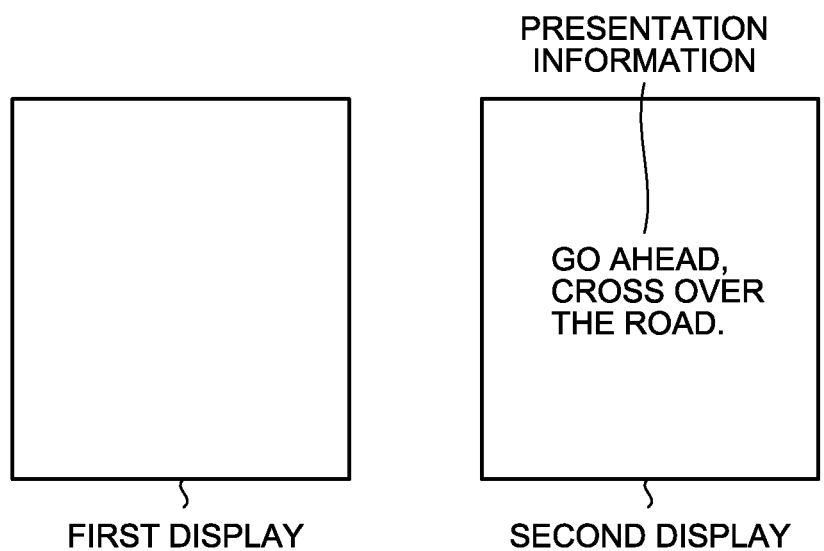

As exemplarily illustrated in FIGS. 16A and 16B, the generator 104 may perform control so as to cause the first display displaying information externally from the vehicle to display the target object information composing the pair and control so as to cause the second display differing from the first display and displaying information externally from the vehicle to display the presentation information composing the pair at timings different from each other. This structure is also an aspect of the concept that "the generator 104 performs control so as to cause the display displaying information externally from the vehicle (own vehicle) to display the pair".

For example, as illustrated in FIG. 16A, the generator 104 performs control so as to cause the first display to display the target object information and cause the second display not to display the presentation information at the timing T1. As illustrated in FIG. 16B, the generator 104 performs control so as to cause the first display not to display the target object information and cause the second display to display the presentation information, at the timing T2 after the timing T1. The generator 104 can repeat the control described above for a certain time period. This structure is also an aspect of the concept that "the generator 104 performs control so as to cause the display displaying information externally from the vehicle (own vehicle) to display the pair".

Third Modification of the Fourth Embodiment

The generator 104 may perform control so as to cause a display that has the best visibility from the target object present at the position indicated by the target object position information 108 among a plurality of displays each displaying information externally from the vehicle (own vehicle) to display the pair in accordance with the target object position information 108, for example.

Figure 17A:
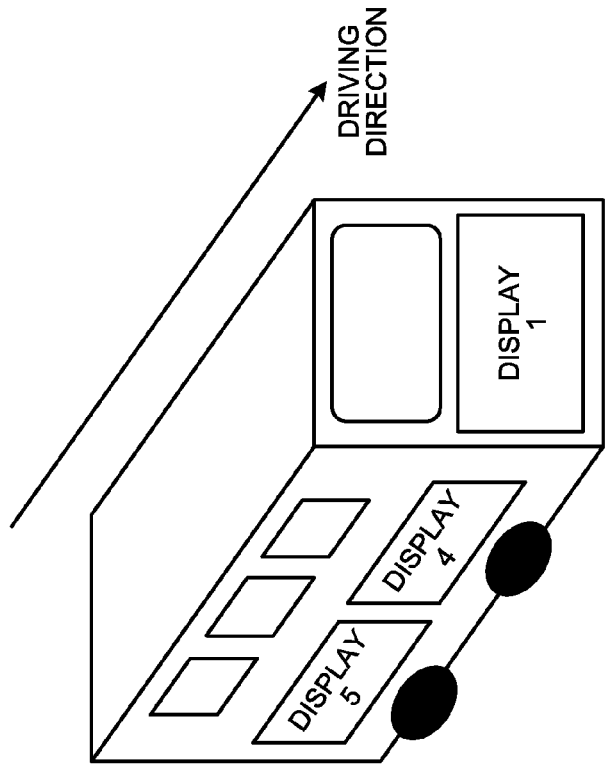
FIGS. 17A and 17B are schematic diagrams to explain a structure of an own vehicle in another modification.
Figure 17B:
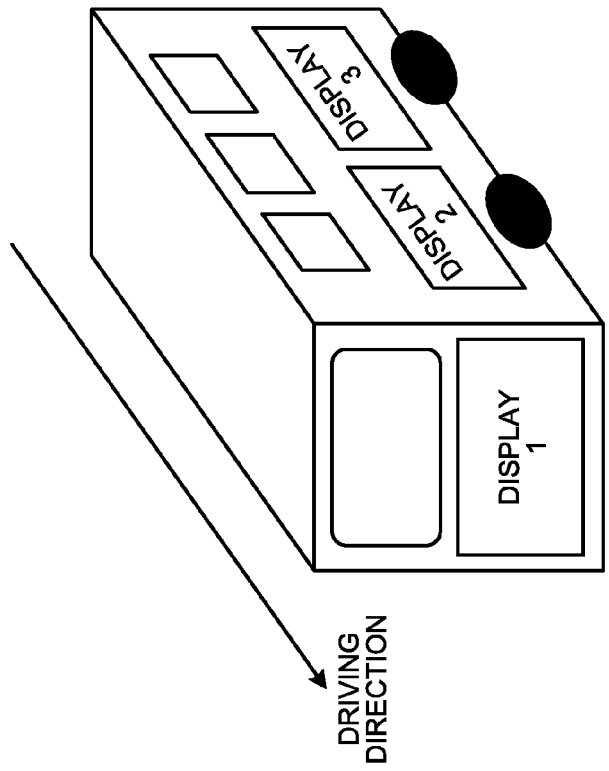

In the embodiment, it is assumed that the vehicle (own vehicle) in which the information presenting apparatus 100 is mounted includes a plurality of displays each displaying information externally from the vehicle. FIG. 17A is a schematic diagram illustrating the own vehicle viewed from the left front side of the own vehicle. FIG. 17B is a schematic diagram illustrating the own vehicle viewed from the right front side of the own vehicle. In the examples illustrated in FIGS. 17A and 17B, a display 1 is provided at the front, displays 2 and 3 are provided on the left side, and displays 4 and 5 are provided on the right side of the own vehicle. The number of displays can be changed to any value and the positions of the displays can be appropriately changed. The generator 104 can grasp the direction in which the target object is located relative to the own vehicle on the basis of the target object position information 108. The generator 104, thus, selects the display most easily seen from the target object and performs control so as to cause the selected display to display the pair of the target object information and the presentation information.

For example, the generator 104 can also obtain, for each of the multiple displays, an inner product of a reference vector and a normal vector of the display. The reference vector is directed from a reference point (typically, the center of a display surface, for example) of the display to the position indicated by the target object position information 108. The generator 104 can select the display that indicates a maximum value among the obtained inner products as the display most easily seen from the target object.

The third modification displays the pair of the target object information and the presentation information on the display having the best visibility from the target object present in the surroundings of the vehicle, thereby making it possible to more reliably present the presentation information to the target object (target object identified by the target object information) to which the presentation information is intended to be presented.

Fifth Embodiment

The following describes a fifth embodiment. Descriptions in common with those of the respective embodiments described above are appropriately omitted. The fifth embodiment differs from the embodiments described above in that the generator 104 has a function to generate a voice signal for the target object identified by the target object information in addition to the pair of the target object information and the presentation information. Any voice signal in any form is applicable that calls attention to the target object.

In the embodiment, the vehicle in which the information presenting apparatus 100 is mounted includes a voice output presenting apparatus that outputs (generates) a voice. The generator 104 performs control so as to cause the display to display the pair of the target object information and the presentation information when determining that the target object present at the position indicated by the target object position information 108 affects the safety in traveling of the own vehicle, as described in the above embodiments. In addition to the control, the generator 104 performs control so as to cause the voice output unit to output the voice signal. For example, a plurality of voice output units may be arranged for respective directions (the multiple voice output units are arranged such that each voice output unit corresponds to one of a plurality of directions). The generator 104 may perform control so as to cause the voice output unit corresponding to the direction toward the target object present at the position indicated by the target object position information 108 to output the voice signal. Alternatively, the generator 104 may perform control so as to cause the voice output unit having directionality to output a directional voice signal toward the direction of the target object.

The voice output unit may be included in the information presenting apparatus 100 as a component, or provided as an external unit of the information presenting apparatus 100 (not included in the information presenting apparatus 100).

The structure of the fifth embodiment displays the pair of the target object information and the presentation information on the display and outputs the voice signal calling attention to the target object from the voice output unit, thereby making it possible to more reliably present the presentation information to the target object (target object identified by the target object information) to which the presentation information is intended to be presented.

Sixth Embodiment

The following describes a sixth embodiment. Descriptions in common with those of the respective embodiments described above are appropriately omitted. FIG. 18 is a schematic diagram illustrating exemplary functions of the information presenting apparatus 100 in the sixth embodiment. As illustrated in FIG. 18, the information presenting apparatus 100 in the sixth embodiment differs from the information presenting apparatus 100 in the first embodiment in that the information presenting apparatus 100 in the sixth embodiment further includes a receiver 601 and a display controller 602.

The receiver 601 has a function to receive operation from a driver of the vehicle. In this example, the vehicle in which the information presenting apparatus 100 is mounted includes a first display that displays information externally from the vehicle and a second display that display information to the driver. In this example, the second display includes a touch panel. The receiver 601 has a function to receive operation performed on the second display.

The display controller 602 controls the display of the first display displaying information externally from the vehicle in accordance with the operation received by the receiver 601. The description is made more specifically below. In the embodiment, the generator 104 performs control so as to cause the second display displaying information to the driver to display the pair generated as described in the first embodiment (the pair of the target object information and the presentation information) when determining that the target object present at the position indicated by the target object position information 108 affects the safety in traveling of the own vehicle. The driver can check the pair of the target object information and the presentation information displayed on the second display, and perform operation to instruct the second display to display the pair on the first display or to instruct the second display not to display the pair on the first display.

When the receiver 601 receives the operation to instruct the first display not to display the pair of the target object information and the presentation information, the display controller 602 performs control so as to cause the first display not to display the pair. When the receiver 601 receives the operation to instruct the first display to display the pair, the display controller 602 performs control so as to cause the first display to display the pair. In this example, when the receiver 601 receives the operation to instruct the first display to display the pair of the target object information and the presentation information, the display controller 602 can perform control so as to request the generator 104 to send the pair and cause the first display to display the pair (e.g., the composite image 109) received from the generator 104.

The structure of the sixth embodiment can reliably present the presentation information to the target object to which the presentation information is intended to be presented while the driver's intention is reflected.

The computer programs executed by the respective information presenting apparatuses 100 in the respective embodiments and modifications may be stored in a computer connected to a network such as the Internet and provided by being downloaded via the network. The computer programs executed by the information presenting apparatuses 100 in the respective embodiments and modifications may be provided or distributed through a network such as the Internet. The computer programs executed by the information presenting apparatuses 100 in the respective embodiments and modifications may be preliminarily embedded and provided in a nonvolatile medium, which may be provided as a computer-program product, such as a ROM.

The respective embodiments and modifications described above can be appropriately combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information presenting apparatus to be mounted in a vehicle, the apparatus comprising hardware circuitry configured to:
   acquire driving information that includes at least a speed and a steering angle of the vehicle;
   calculate, based on the driving information, an own vehicle region that indicates a region in which the vehicle moves;
   acquire target object position information that indicates a position of a target object present in surroundings of the vehicle; and
   generate a pair of target object information and presentation information when the position indicated by the target object position information is included in the own vehicle region, the target object information identifying the target object present at the position indicated by the target object position information, the presentation information indicating information that encourages the target object to perform a certain action.

2. The apparatus according to claim 1, wherein
   the acquiring driving information acquires a captured image obtained by image capturing of the surroundings of the vehicle together with the driving information,
   the calculating estimates, based on the captured image and the driving information, a region in which the vehicle moves in the captured image, and calculates the estimation result as the own vehicle region, and
   the acquiring target object position information acquires, as the target object position information, information that indicates the position of the target object captured in the captured image in the captured image.

3. The apparatus according to claim 1, wherein the acquiring target object position information changes a range serving as a target from which the target object position information is acquired in the surroundings of the vehicle in accordance with the speed of the vehicle, the speed being included in the driving information.

4. The apparatus according to claim 1, wherein the generating generates, as the presentation information, information that encourages the target object to perform an action for securing safety in traveling of the vehicle.

5. The apparatus according to claim 1, wherein
   the acquiring driving information acquires a captured image obtained by image capturing of the surroundings of the vehicle together with the driving information, and
   the generating generates, as the target object information, an image of a region corresponding to the position indicated by the target object position information in the captured image.

6. The apparatus according to claim 1, wherein the generating generates, as the target object information, a pictogram that represents the target object present at the position indicated by the target object position information.

7. The apparatus according to claim 1, wherein the generating performs control so as to cause a display that displays information externally from the vehicle to display the generated pair.

8. The apparatus according to claim 1, wherein the generating generates a voice signal directed to the target object identified by the target object information in addition to the pair.

9. An information presenting apparatus to be mounted in a vehicle, the apparatus comprising hardware circuitry configured to:
   acquire driving information that includes at least a speed and a steering angle of the vehicle;
   calculate, based on the driving information, an own vehicle region that indicates a region in which the vehicle moves;
   acquire target object position information that indicates a position of a target object present in surroundings of the vehicle;
   calculate, based on the target object position information, a target object region that indicates a region in which the target object moves; and
   generate a pair of target object information and presentation information when at least a part of the target object region overlaps the own vehicle region, the target object information identifying the target object present at the position indicated by the target object position information, the presentation information indicating information that encourages the target object to perform a certain action.

10. The apparatus according to claim 9, wherein
the acquiring driving information acquires a captured image obtained by image capturing of the surroundings of the vehicle together with the driving information,
the calculating an own vehicle estimates, based on the captured image and the driving information, a region in which the vehicle moves in the captured image, and calculates the estimation result as the own vehicle region, and
the acquiring target object position information acquires, as the target object position information, information that indicates the position of the target object captured in the captured image in the captured image.

11. The apparatus according to claim 9, wherein
the acquiring driving information acquires a captured image obtained by image capturing of the surroundings of the vehicle together with the driving information, and
the calculating a target object region estimates a moving vector of the target object using a plurality of captured images obtained at different timings and a plurality of pieces of target object position information each corresponding to one of the captured images, and estimates the target object region using the estimated moving vector.

12. The apparatus according to claim 9, wherein
the acquiring driving information acquires a captured image obtained by image capturing of the surroundings of the vehicle together with the driving information, and
the calculating a target object region estimates a moving direction of another vehicle serving as the target object present at the position indicated by the target object position information in the captured image based on a lighting state of indicators of the other vehicle, and calculates, as the target object region, a region corresponding to the estimated moving direction in the captured image.

13. The apparatus according to claim 9, wherein
the acquiring driving information acquires a captured image obtained by image capturing of the surroundings of the vehicle together with the driving information, and
the calculating a target object region estimates a moving direction of a person serving as the target object present at the position indicated by the target object position information in the captured image based on a direction of the person's face or body, and calculates, as the target object region, a region corresponding to the estimated moving direction in the captured image.

14. The apparatus according to claim 9, wherein the acquiring target object position information changes a range serving as a target from which the target object position information is acquired in the surroundings of the vehicle in accordance with the speed of the vehicle, the speed being included in the driving information.

15. The apparatus according to claim 9, wherein the generating generates, as the presentation information, information that encourages the target object to perform an action for securing safety in traveling of the vehicle.

16. The apparatus according to claim 9, wherein
the acquiring driving information acquires a captured image obtained by image capturing of the surroundings of the vehicle together with the driving information, and
the generating generates, as the target object information, an image of a region corresponding to the position indicated by the target object position information in the captured image.

17. The apparatus according to claim 9, wherein the generating generates, as the target object information, a pictogram that represents the target object present at the position indicated by the target object position information.

18. The apparatus according to claim 9, wherein the generating performs control so as to cause a display that displays information externally from the vehicle to display the generated pair.

19. The apparatus according to claim 9, wherein the generating generates a voice signal directed to the target object identified by the target object information in addition to the pair.

20. An information presenting method performed by an information presenting apparatus to be mounted in a vehicle, the method comprising:
acquiring driving information that includes at least a speed and a steering angle of the vehicle;
calculating, based on the driving information, an own vehicle region that indicates a region in which the vehicle moves;
acquiring target object position information that indicates a position of a target object present in surroundings of the vehicle; and
generating a pair of target object information and presentation information when the position indicated by the target object position information is included in the own vehicle region, the target object information identifying the target object present at the position indicated by the target object position information, the presentation information indicating information that encourages the target object to perform a certain action.

* * * * *